(12) United States Patent
Misumi et al.

(10) Patent No.: US 11,134,320 B2
(45) Date of Patent: Sep. 28, 2021

(54) SENSOR MANAGEMENT UNIT, SENSOR DEVICE, SENSOR MANAGEMENT METHOD, AND SENSOR MANAGEMENT PROGRAM

(71) Applicant: OMRON Corporation, Kyoto (JP)

(72) Inventors: Shuichi Misumi, Kyoto (JP); Tetsuji Yamato, Yokohama (JP); Takeshi Naito, Tokyo (JP); Ryota Yamada, Tokyo (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/623,798

(22) PCT Filed: Jul. 25, 2018

(86) PCT No.: PCT/JP2018/027821
§ 371 (c)(1),
(2) Date: Dec. 18, 2019

(87) PCT Pub. No.: WO2019/026709
PCT Pub. Date: Feb. 7, 2019

(65) Prior Publication Data
US 2020/0177975 A1    Jun. 4, 2020

(30) Foreign Application Priority Data
Aug. 3, 2017   (JP) .............................. JP2017-150420

(51) Int. Cl.
*H04Q 9/00*   (2006.01)
(52) U.S. Cl.
CPC ........... *H04Q 9/00* (2013.01); *H04Q 2209/10* (2013.01); *H04Q 2209/84* (2013.01); *H04Q 2209/86* (2013.01)

(58) Field of Classification Search
CPC .......... H04Q 2209/00; H04Q 2209/10; H04Q 2209/40; H04Q 2209/80; H04Q 2209/84; H04Q 2209/86; H04Q 9/00
See application file for complete search history.

(56) References Cited

U.S. PATENT DOCUMENTS

| 7,895,456 B2 * | 2/2011 | Ferentz | ................... | H04L 12/12 |
| | | | | 713/300 |
| 8,392,401 B1 * | 3/2013 | Aly | ....................... | H04L 67/125 |
| | | | | 707/718 |

(Continued)

FOREIGN PATENT DOCUMENTS

| CN | 102356413 A | 2/2012 |
| CN | 104025628 A | 9/2014 |

(Continued)

OTHER PUBLICATIONS

International Search Report of PCT/JP2018/027821 dated Sep. 11, 2018.

(Continued)

*Primary Examiner* — Franklin D Balseca
(74) *Attorney, Agent, or Firm* — Metrolex IP Law Group, PLLC (57) ABSTRACT

A sensor management unit includes an obtaining unit that obtains sensing data from a sensing device to generate sensing data of a plurality of sensing items, a detection unit that detects an overloaded state of the sensing device, a retrieval unit that determines, based on a detection result obtained by the detection unit, at least one sensing item to be retrieved from of the plurality of sensing items and retrieves the determined sensing item, and an output unit that outputs the retrieved sensing item to an external device.

8 Claims, 5 Drawing Sheets

(56) References Cited

U.S. PATENT DOCUMENTS

| | | | |
|---|---|---|---|
| 8,634,299 B2* | 1/2014 | Lautenschlaeger | H04L 47/2475 370/235 |
| 9,779,183 B2* | 10/2017 | Gallo | G06F 16/907 |
| 10,469,805 B2* | 11/2019 | Wang | H04N 7/181 |
| 10,592,306 B2* | 3/2020 | Bucsa | H04L 65/1036 |
| 2009/0147309 A1 | 6/2009 | Nagashima | |
| 2012/0002549 A1 | 1/2012 | Dempo | |
| 2012/0116724 A1 | 5/2012 | Takara et al. | |
| 2014/0122806 A1* | 5/2014 | Lin | H04L 67/12 711/126 |
| 2014/0267843 A1 | 9/2014 | Sakaguchi | |
| 2014/0304544 A1 | 10/2014 | Takenaka | |
| 2015/0245212 A1 | 8/2015 | Kawamura | |
| 2017/0106530 A1 | 4/2017 | Shimokawa et al. | |
| 2017/0177897 A1 | 6/2017 | Kiriyama et al. | |
| 2018/0373956 A1 | 12/2018 | Yamato | |

FOREIGN PATENT DOCUMENTS

| | | |
|---|---|---|
| CN | 104052920 A | 9/2014 |
| JP | 2009-145970 A | 7/2009 |
| JP | 2015-149640 A | 8/2015 |
| JP | 2017-76334 A | 4/2017 |
| JP | 2017-111501 A | 6/2017 |
| WO | 2014/045699 A1 | 3/2014 |

OTHER PUBLICATIONS

Written Opinion of PCT/JP2018/027821 dated Sep. 11, 2018.
Extended European search report dated Dec. 18, 2020 for the counterpart European Patent Application.
Chinese Office Action dated May 31, 2021 for the counterpart Chinese patent application, with English translation.

* cited by examiner

| Attribute name | | | |
|---|---|---|---|
| Sensing data provider | | | |
| | Organization | | |
| | | Organization name | |
| | | Organization name in katakana | |
| | | Contact | |
| Sensing data provision period | | | |
| | Period | | |
| | | Start | |
| | | End | |
| Sensing data measurement site | | | |
| | Type | | |
| | Measurement site | | |
| Sensing data target | | | |
| | Sensing data name | | |
| | Sensing data description | | |
| | Sensing data use genre | | |
| | | Genre name | |
| | Measurement target | | |
| | | Measurement target name | |
| | | Measurement target description | |
| | | Measurement characteristics | |
| | | | Measurement characteristics name |
| | | | Measurement characteristics description |
| | | | Measurement characteristics unit |
| | | | Measurement date/time of measurement characteristics |
| Event data specifications | | | |
| | Event data | | |
| | | Event data identification name | |
| | | Event data description | |
| Terms of data sales contract | | | |
| | Use purpose | | |
| | Scope of provision | | |
| | Trade condition | | |
| | Personal information | | |
| | Anonymized information | | |
| | Data validity period limitation | | |
| | | Start | |
| | | End | |
| | Payment type | | |

FIG. 3

| Attribute name | | | |
|---|---|---|---|
| Sensing data user | | | |
| | Organization | | |
| | | Organization name | |
| | | Organization name in katakana | |
| | | Contact | |
| Sensing data use period | | | |
| | Period | | |
| | | Start | |
| | | End | |
| Sensing data measurement site | | | |
| | Type | | |
| | Measurement site | | |
| Sensing data target | | | |
| | Sensing data name | | |
| | Sensing data description | | |
| | Sensing data use genre | | |
| | | Genre name | |
| | Measurement target | | |
| | | Measurement target name | |
| | | Measurement target description | |
| | | Measurement characteristics | |
| | | | Measurement characteristics name |
| | | | Measurement characteristics description |
| | | | Measurement characteristics unit |
| | | | Measurement date/time of measurement characteristics |
| Event data specifications | | | |
| | Event data | | |
| | | Event data identification name | |
| | | Event data description | |
| Terms of data sales contract | | | |
| | Use purpose | | |
| | Scope of provision | | |
| | Trade condition | | |
| | Personal information | | |
| | Anonymized information | | |
| | Data validity period limitation | | |
| | | Start | |
| | | End | |
| | Payment type | | |

SENSOR MANAGEMENT UNIT, SENSOR DEVICE, SENSOR MANAGEMENT METHOD, AND SENSOR MANAGEMENT PROGRAM

FIELD

The present invention relates to a technique for retrieving sensing data to be traded.

BACKGROUND

Patent Literature 1 describes a system that allows multiple client terminals to share a device connected through a network.

CITATION LIST

Patent Literature

Patent Literature 1: Japanese Unexamined Patent Application Publication No. 2009-145970

SUMMARY

Technical Problem

However, Patent Literature 1 describes no structure to reduce a device load when multiple client terminals transmit job requests to the device at similar times. The device is thus overloaded and is highly likely to malfunction. Once overloaded, a device of a certain type may process requested jobs with lower accuracy.

The system described in Patent Literature 1 thus cannot reduce malfunctioning of the device likely in an overloaded state (e.g., faults or lower processing accuracy).

One or more aspects of the present invention are directed to a technique for reducing malfunctioning of a shared sensing device likely in an overloaded state of the device.

Solution to Problem

In response to the above issue, a sensor management unit according to one or more aspects of the present invention has the structure described below.

The sensor management unit includes an obtaining unit that obtains sensing data from a sensing device to generate sensing data of a plurality of sensing items, a detection unit that detects an overloaded state of the sensing device, a retrieval unit that determines, based on a detection result obtained by the detection unit, at least one sensing item to be retrieved from the plurality of sensing items and retrieves the determined sensing item, and an output unit that outputs the retrieved sensing item to an external device.

In this manner, the sensing item to be retrieved is determined based on whether the sensing device is overloaded. This structure can change the device load in accordance with the state of the sensing device when the device is shared by multiple users. This structure prevents the sensing device from being overloaded and malfunctioning.

The retrieval unit may retrieve the sensing item within a range in which the sensing device avoids an overloaded state.

In this structure, the retrieval unit retrieves the sensing item within the range in which the sensing device avoids an overloaded state. This structure can prevent the device from being overloaded.

The output unit may output metadata about the sensing device including the sensing item retrieved by the retrieval unit.

In this structure, the metadata is output, and thus can be updated dynamically depending on situations.

The detection unit may detect an overloaded state of the sensing device based on power consumption of the sensing device.

In this structure, the state of the sensing device is detected based on the current power consumption. The state of the sensing device can thus be detected by detecting the power consumption.

The detection unit may detect an overloaded state of the sensing device based on a processing load of a central processing unit (CPU) included in the sensing device.

In this structure, the state of the sensing device is detected based on the processing load of the CPU in the sensing device. The state of the sensing device can thus be detected by detecting the processing load of the CPU.

The detection unit may detect an overloaded state of the sensing device based on an amount of heat generated by the sensing device.

In this structure, the state of the sensing device is detected based on the amount of heat generated by the sensing device. The state of the sensing device can thus be detected by detecting the temperature of the sensing device.

The detection unit may detect an overloaded state of the sensing device based on a capacity of communication between the sensor management unit and the sensing device, In this structure, the state of the sensing device is detected based on the capacity of communication between the sensor management unit and the sensing device. The state of the sensing device can thus be detected by detecting the capacity of communication between the sensor management unit and the sensing device.

Advantageous Effects

The aspects of the present invention reduce malfunctioning of a shared sensing device likely in an overloaded state of the device. When the sensing device has an extra capacity for loads, the sensing device can accept an additional application that uses sensing data to maximize its sensing functionality.

DETAILED DESCRIPTION

One or more embodiments of the present invention will now be described.

Figure 1:
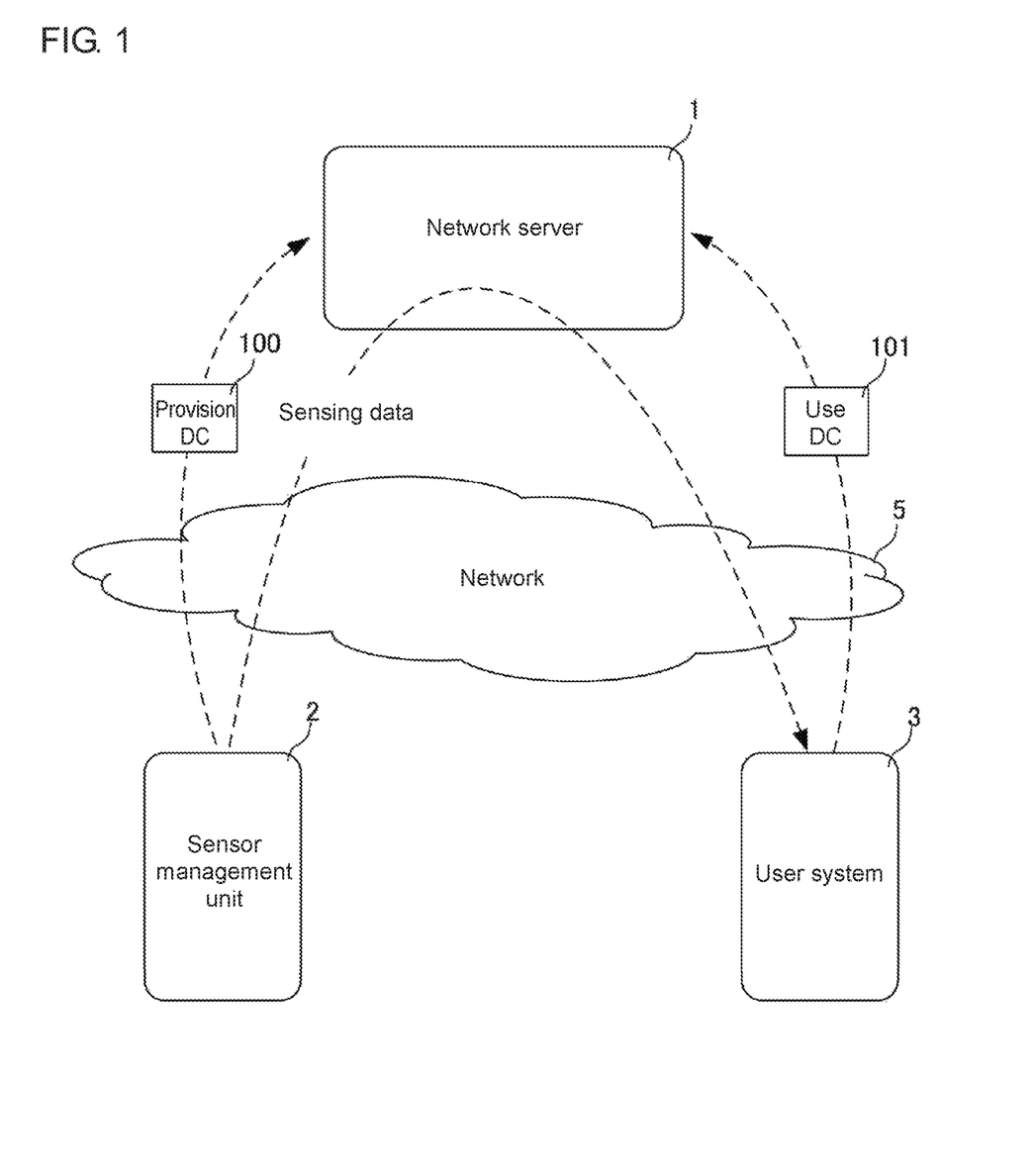
FIG. 1 is a schematic diagram of a sensing data distribution system.

A sensing data distribution system that distributes sensing data between a provider and a user to promote use of the sensing data will now be described briefly. FIG. 1 is a schematic diagram of the sensing data distribution system. The sensing data distribution system includes a network server 1, sensor management units 2, and user systems 3 that are connected through a network 5 to allow data communication between them. Multiple sensor management units 2 (represented by a single sensor management unit 2 in FIG. 1) are connected to the network server 1 through the network 5. Similarly, multiple user systems 3 (represented by a single user system 3 in FIG. 1) are connected to the network server 1 through the network 5. The sensing data distribution system distributes sensing data that is traded between the sensor management units 2 and the user systems 3.

The network server 1 defines a sensing data distribution market that serves as a marketplace for distributing sensing data on the Internet, or specifically a sensing data trading market (SDTM). The sensor management units 2 each provide sensing data obtained by sensing the measurement characteristics of a measurement target with a sensor (not shown). The user systems 3 each use sensing data provided by the sensor management units 2. Each measurement characteristic corresponds to a sensing item in an aspect of the present invention.

Measurement targets herein include abstract objects representing real-world phenomena (e.g., persons, objects, and events), and include, for example, households, adults, automobiles, and weather. The measurement characteristics refer to the attributes of a measurement target to be monitored by a sensor. For example, the measurement characteristics for a household include temperature and humidity. The measurement characteristics for an adult include a maximum blood pressure, a minimum blood pressure, and a pulse. The measurement characteristics for an automobile include position and speed. The measurement characteristics for weather include temperature and rainfall.

The sensor management unit 2 registers a provision data catalog 100 (provision DC 100), which is associated with sensing data to be traded in the SDTM, with the network server 1. The provision data catalog 100 stores attribute information about sensing data to be provided. Each user system 3 registers a use data catalog 101 (use DC 101), which is associated with sensing data to be traded in the SDTM, with the network server 1. The use data catalog 101 stores attribute information about sensing data to be used.

Figure 2:
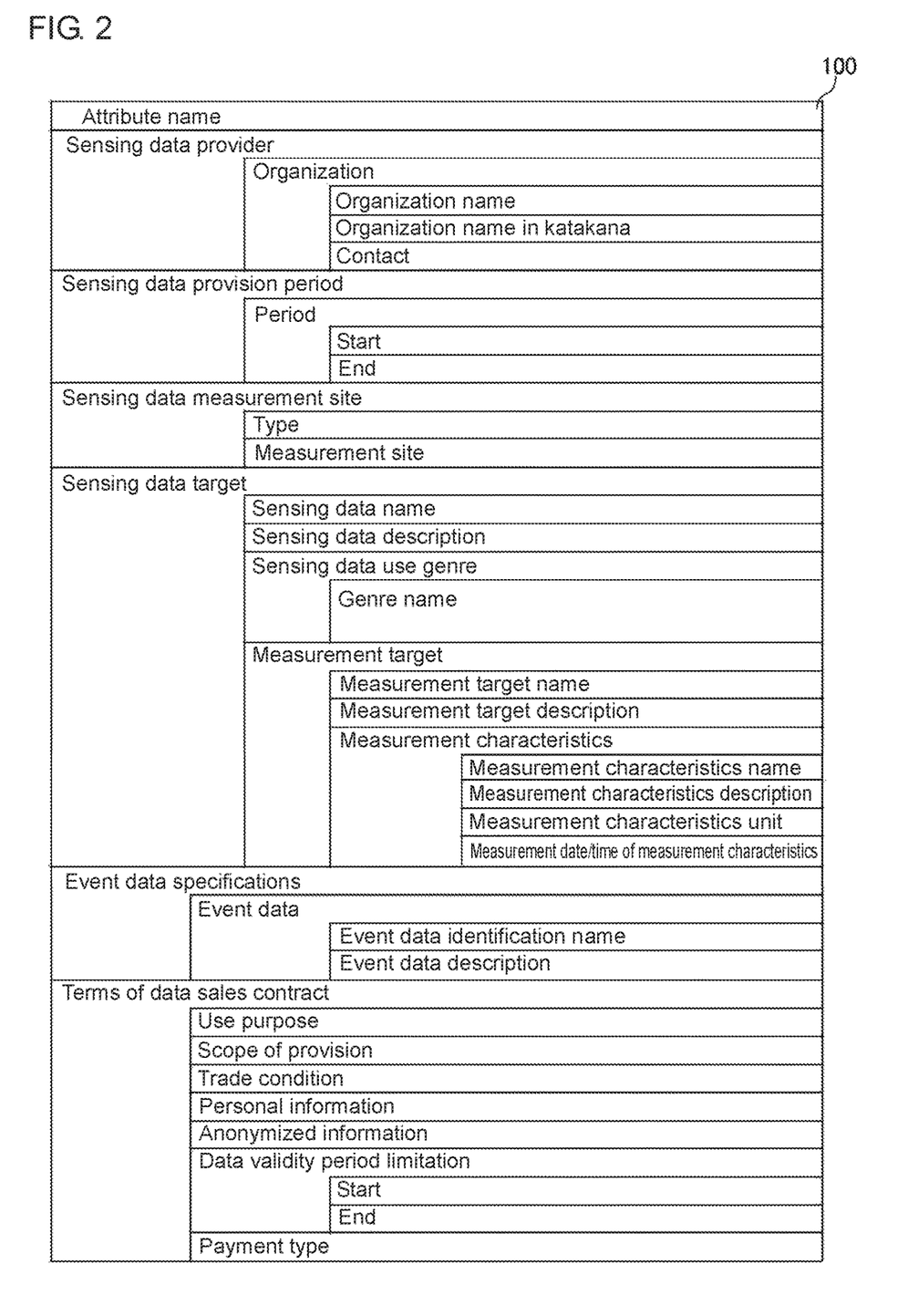
FIG. 2 is a diagram describing the details of a provision data catalog.
Figure 3:
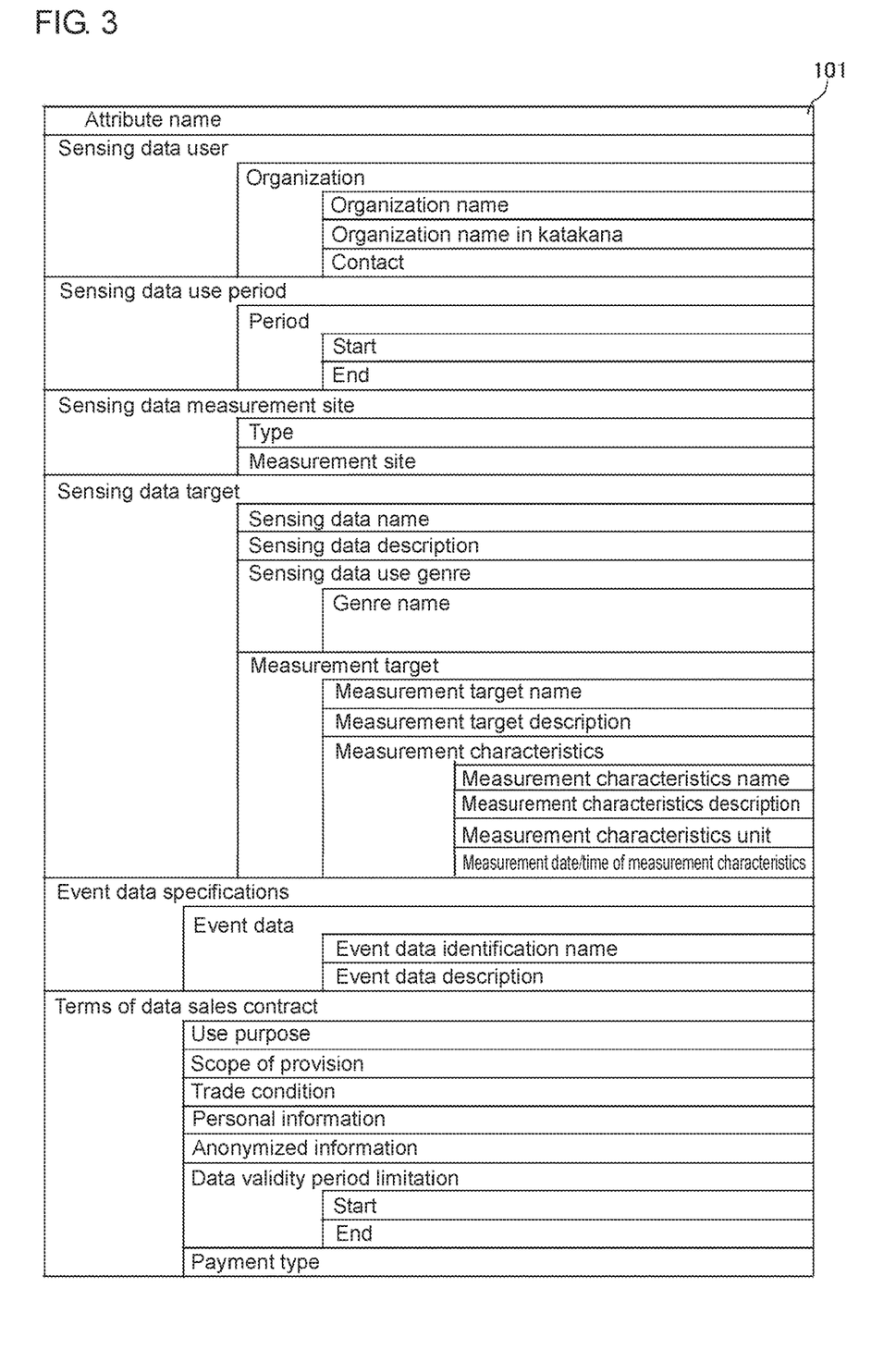
FIG. 3 is a diagram describing the details of a use data catalog.

The provision data catalog 100 and the use data catalog 101 will now be described. FIG. 2 is a diagram describing the details of the provision data catalog 100, FIG. 3 is a diagram describing the details of the use data catalog 101. As shown in FIG. 2, the provision data catalog 100 mainly stores items for a sensing data provider, a sensing data provision period, a sensing data measurement site, a sensing data target, event data specifications, and the terms of a data sales contract.

The sensing data provider is an item associated with an organization (an individual or a business entity) that provides sensing data. The attribute information about the sensing data provider includes the name of the organization (organization name), the name of the organization written in katakana characters (organization name in katakana), and the contact of the organization (contact).

The sensing data provision period is an item associated with a period for providing sensing data. The attribute information about the sensing data provision period includes the start date of the sensing data provision (start) and the end date of the sensing data provision (end).

The sensing data measurement site is an item associated with a site at which the measurement target undergoes sensing. The attribute information about the sensing data measurement site includes a measurement site and a measurement site type. The measurement site type is either fixed, indicating that the measurement site is fixed for every measurement, or variable, indicating that the measurement site varies for every measurement. The measurement site is provided for the measurement type fixed.

The sensing data target is an item associated with sensing data. The attribute information about the sensing data target includes the name of the sensing data (sensing data name), a brief description of the sensing data (sensing data description), a genre in which the sensing data is used (genre name), and a measurement target. The measurement target is provided for each measurement target, and includes information indicating the name, description, and attribute of the measurement target. The measurement characteristics include information indicating the name, description, unit, and type of the measurement date and time (either intermittent or continuous) of the measurement characteristics.

The event data specifications are an item associated with an event condition. The attribute information about the event data specifications includes a label name of an event condition (event data identification name) and the meaning and data representation of an event data value (event data description).

The terms of the data sales contract are an item associated with sensing data trading. The attribute information about the terms of the data sales contract includes the use purpose, the scope of provision, trade conditions, personal information, anonymized information, a data validity period limitation, and the payment type. The use purpose indicates the purpose of using sensing data (for profit, non-profit, or unlimited). The scope of provision indicates whether to provide the sensing data to a third party. The trade condition indicates, for example, whether sensing data is unduplicable, duplicable, modifiable, or processable. The personal information indicates whether sensing data includes personal information. The anonymized information indicates whether sensing data includes anonymized information. The data validity period limitation indicates the start date and the end date of the validity period of sensing data. The payment type indicates a method of payment of the sensing data fee.

As shown in FIG. 3, the use data catalog 101 mainly includes a sensing data user, a sensing data use period, a sensing data measurement site, a sensing data target, event data specifications, and the terms of a data sales contract. The use data catalog 101 has the same format as the provision data catalog 100 described above. The use data catalog 101 includes a sensing data measurement site, a sensing data target, event data specifications, and the terms of a data sales contract, which are the same as the corresponding items in the provision data catalog 100.

The sensing data user is an item associated with an organization (an individual or a business entity) that uses sensing data. The attribute information about the sensing data user includes the name of the organization (organization name), the name of the organization written in katakana characters (organization name in katakana), and the contact of the organization (contact). The sensing data use period is an item associated with a period for which sensing data can be used. The attribute information about the sensing data use period includes the start date of the sensing data use (start) and the end date of the sensing data use (end).

The network server 1 performs matching to retrieve any sensor management unit 2 to provide sensing data to the user system 3 based on the consistency between the provision data catalog 100 and the use data catalog 101, and distributes the sensing data between the sensor management unit 2 and the user system 3.

As shown in FIG. 1, the sensing data may be provided from the sensor management unit 2 to the user system 3 through the network server 1 or without through the network server 1.

Figure 4:
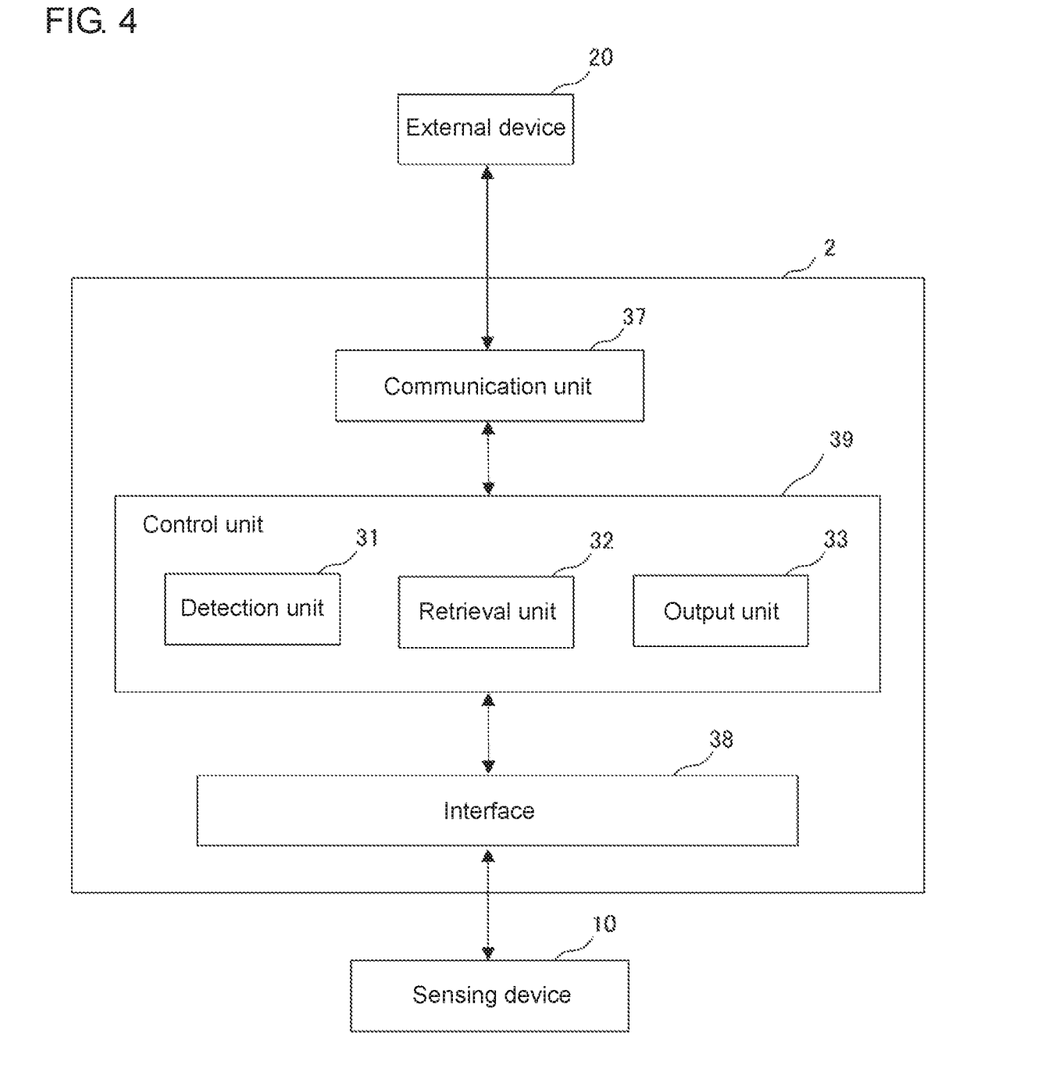
FIG. 4 is a block diagram of a sensor device showing its main components.

A sensor device according to an embodiment of the present invention will now be described. FIG. 4 is a diagram of the sensor device showing its main components. The sensor device includes the sensor management unit 2 and a sensing device 10. The sensor management unit 2 includes a control unit 39, a communication unit 37, and an interface 38.

The control unit 39 is connected to a network 60, such as the Internet, or an external device 20 through the communication unit 37. The control unit 39 is connected to the sensing device 10 through the interface 38. The interface 38 corresponds to an obtaining unit in an aspect of the present invention. The interface 38 obtains sensing data from the sensing device 10. The sensing device 10 performs sensing on multiple sensing items. More specifically, the sensing device 10 generates sensing data of multiple different sensing items. Multiple sensing devices 10 may be used, although a single sensing device 10 is used in the present embodiment. When multiple sensing devices 10 are provided, the sensor management unit 2 functions in the same manner for each sensing device 10.

The control unit 39 includes a detection unit 31, a retrieval unit 32, and an output unit 33. The detection unit 31 detects the state of the sensing device 10. The state of the sensing device 10 is the state of a load currently applied to the sensing device 10 (whether the sensing device 10 is overloaded). More specifically, the state of the load reveals whether a sensing item can be added to or deleted from the sensing device 10. The method used by the detection unit 31 to detect the state of the sensing device 10 will be described later.

The retrieval unit 32 determines at least one sensing item to be retrieved from multiple different sensing items based on the state of the sensing device 10 (whether the sensing device 10 is overloaded), and retrieves the determined sensing item. The output unit 33 outputs the sensing item retrieved by the retrieval unit 32 to the external device 20. The external device 20 may be a display.

The retrieval unit 32 also retrieves a sensing item acceptable by the sensing device 10. More specifically, the retrieval unit 32 retrieves a sensing item within a range in which the sensing device 10 avoids an overloaded state. The retrieval unit 32 retrieves the sensing item based on the state of the sensing device 10. This structure prevents the sensing device 10 from being overloaded. When the sensing device 10 has a small load, an extra sensing item can be added to the sensing device 10. More specifically, the sensor management unit 2 adds an application that uses the sensing data, and provides more sensing data to the user.

The output unit 33 outputs metadata about the sensing device 10 associated with sensing items. The metadata herein refers to the provision data catalog 100 in the present embodiment. The output unit 33 outputs the metadata associated with the sensing items, enabling the metadata to be dynamically updated depending on situations. More specifically, the sensor management unit 2 provides, to the user, the provision data catalog 100 corresponding to the metadata that is dynamically updated in accordance with the load on the sensing device 10.

The method for detecting the state of the sensing device 10 used by the detection unit 31 will now be described.

(1) The detection unit 31 detects the state of the sensing device 10 based on the current power consumption of the sensing device 10.

The state of the sensing device 10 is detected based on the current power consumption. For example, a predetermined range is preset for the power consumption of the sensing device 10. More specifically, the power consumption is provided with hysteresis in the predetermined range in the detection performed by the detection unit 31. When the power consumption of the sensing device 10 exceeds the predetermined range, the detection unit 31 detects the state of the sensing device 10 for deleting a sensing item (overloaded). When the power consumption of the sensing device 10 is below the predetermined range, the detection unit 31 detects the state of the sensing device 10 for adding a sensing item (not overloaded). In this manner, the detection unit 31 detects the state of the sensing device 10 by detecting the power consumption of the sensing device 10.

(2) The detection unit 31 detects the state of the sensing device 10 based on a preset processing load of a central processing unit (CPU) included in the sensing device 10.

A large processing load on the CPU in the sensing device 10 lowers the efficiency of the CPU. In contrast, a small processing load on the CPU of the sensing device 10 increases the efficiency of the CPU. The processing load of the CPU in the sensing device 10 is thus provided with hysteresis in the detection performed by the detection unit 31 in the same manner as for the power consumption. When the processing load of the CPU in the sensing device 10 exceeds a predetermined range, the detection unit 31 detects the state of the sensing device 10 for deleting a sensing item (overloaded). When the processing load of the CPU in the sensing device 10 is below the predetermined range, the detection unit 31 detects the state of the sensing device 10 for adding a sensing item (not overloaded). In this manner, the detection unit 31 detects the state of the sensing device 10 by detecting the processing load of the CPU in the sensing device 10.

(3) The detection unit 31 detects the state of the sensing device 10 based on the amount of heat generated by the sensing device 10.

The detection unit 31 detects the state of the sensing device 10 based on the amount of heat generated by the sensing device 10. Typically, the sensing device 10 under a larger load generates more heat. The amount of heat generated by the sensing device 10 is thus provided with hysteresis in the detection performed by the detection unit 31 in the same manner as for the power consumption. When the amount of heat generated by the sensing device 10 exceeds a predetermined range, the detection unit 31 detects the state of the sensing device 10 for deleting a sensing item (overloaded). When the amount of heat generated by the sensing device 10 is below the predetermined range, the detection unit 31 detects the state of the sensing device 10 for adding a sensing item (not overloaded). In this manner, the detection unit 31 detects the state of the sensing device 10 by detecting the amount of heat generated by the sensing device 10.

(4) The detection unit 31 detects the state of the sensing device 10 based on the capacity of communication with the sensing device 10.

The state of the sensing device 10 is detected based on the communication capacity between the sensor management unit 2 and the sensing device 10. The sensor management unit 2 determines the capacity of communication with the sensing device 10 at a certain point in time to determine the remaining available communication capacity at the point in time. The capacity of communication with the sensing device 10 is provided with hysteresis in the detection performed by the detection unit 31 in the same manner as for the power consumption. When the capacity of communication with the sensing device 10 exceeds a predetermined range, the detection unit 31 detects the state of the sensing device 10 for deleting a sensing item (overloaded). When the capacity of communication with the sensing device 10 is below the predetermined range, the detection unit 31 detects the state of the sensing device 10 for adding a sensing item (not overloaded). In this manner, the detection unit 31 detects the state of the sensing device 10 by detecting the capacity of communication with the sensing device 10.

The detection unit 31 may detect the state of the sensing device 10 using at least one condition (not limiting to the conditions (1) to (4) described above).

The control unit 39 in the sensor management unit 2 includes a hardware CPU, a memory, and other electronic circuits. The hardware CPU functions as the detection unit 31, the retrieval unit 32, and the output unit 33 described above. The memory has an area for expanding a sensor management program according to one or more embodiments of the present invention and an area for temporarily storing data generated by executing the sensor management program. The control unit 39 may be a large scale integrated circuit (LSI) integrating, for example, a hardware CPU and a memory.

Figure 5:
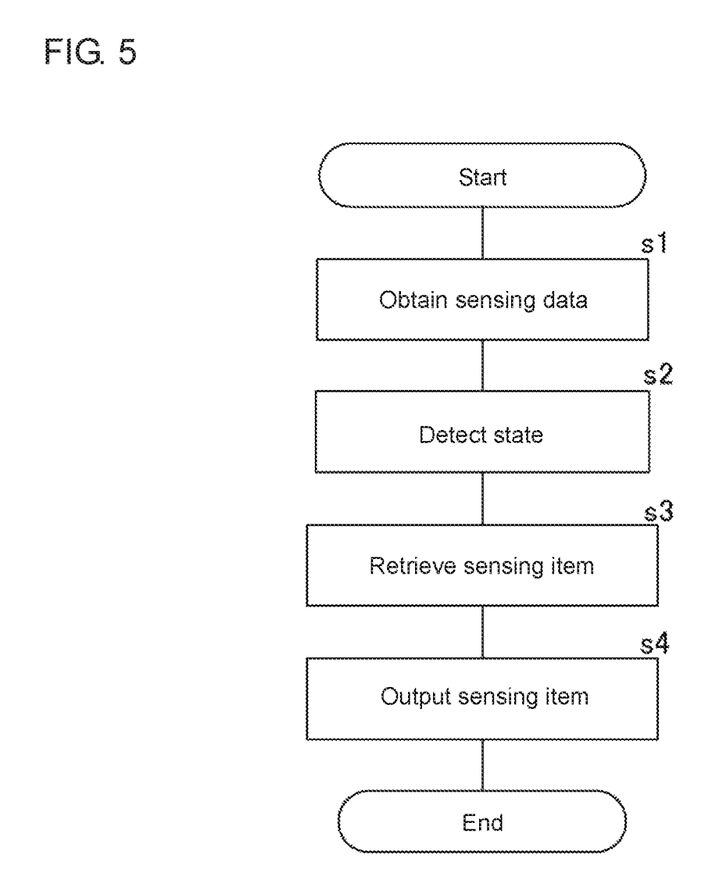
FIG. 5 is a flowchart showing the processing performed by a sensor management unit.

The operation of the sensor management unit 2 will now be described with reference to FIG. 5. FIG. 5 is a flowchart showing the processing performed by the sensor management unit 2.

First, the interface 38 in the sensor management unit 2 obtains sensing data from the sensing device 10 (s1). As described above, the sensing device 10 performs sensing on multiple sensing items. The sensing items include air pressure, seismic intensity, temperature, and the number of people estimated from sound pressure variation.

The detection unit 31 then detects the state of the sensing device 10 (s2). The state of the sensing device 10 is detected using, for example, the conditions (1) to (4) described above. In this example, the state is detected using the condition (1) described above. For example, when the current power consumption is within the predetermined range, the detection unit 31 detects the state of the sensing device 10 for neither deleting nor adding a sensing item. When the current power consumption is below the predetermined range, the detection unit 31 detects the state of the sensing device 10 that can accept an additional sensing item. When the current power consumption exceeds the predetermined range, the detection unit 31 detects the state of the sensing device 10 for deleting a sensing item. In this manner, the detection unit 31 detects the state of the sensing device 10 based on the current power consumption.

The retrieval unit 32 retrieves at least one of multiple sensing items based on the state of the sensing device 10 detected by the detection unit 31 (s3). The retrieval unit 32 retrieves a sensing item acceptable by the sensing device 10. For example, the retrieval unit 32 retrieves a sensing item to set the current power consumption to 60 to 80%. This structure prevents the sensing device 10 from being overloaded. When the sensing device 10 has a small load, an additional sensing item can be added to the sensing device 10. More specifically, the sensor management unit 2 provides more sensing data to the user, The output unit 33 outputs the retrieved sensing item to the external device 20 (s4). For example, the output unit 33 outputs the sensing item about an earthquake retrieved by the retrieval unit 32. This allows smooth output of data about, for example, the air pressure, the seismic intensity, the temperature, and the number of people sensed by the sensing device 10, to a user at, for example, a disaster prevention related facility, a vacation rental management company, and a room management company.

In this manner, the sensing item is retrieved based on the state of the sensing device 10. The sensor management unit 2 can thus change the load on the sensing device 10 in accordance with the state of the sensing device 10 although the sensing device 10 is shared by multiple users. This prevents the sensing device 10 from being overloaded and malfunctioning. As a result, the sensing device 10 is prevented from being overloaded and being disabled from performing a normal operation.

The present invention is not limited to the above embodiments, but the components may be modified without departing from the spirit and scope of the invention in its implementation. The components described in the above embodiments may be combined as appropriate to provide various aspects of the invention. For example, some of the components described in the above embodiments may be eliminated. Further, components in different embodiments may be combined as appropriate.

The above embodiments may be partially or entirely expressed in, but not limited to, the following forms shown in the appendixes below.

Appendix 1

A sensor management unit, comprising:
at least one hardware processor configured to
obtain sensing data from a sensing device to perform sensing for a plurality of sensing items;
detect a state of the sensing device;
retrieve, based on the state of the sensing device, at least one sensing item from the plurality of sensing items; and
output the retrieved sensing item to an external device.

Appendix 2

A sensor management method implementable by at least one hardware processor, the method comprising:
obtaining sensing data from a sensing device to perform sensing for a plurality of sensing items;
detecting a state of the sensing device;
retrieving, based on the state of the sensing device, at least one sensing item from the plurality of sensing items; and
outputting the retrieved sensing item o an external device.

REFERENCE SIGNS LIST 2 sensor management unit
10 sensing device
20 external device
31 detection unit
32 retrieval unit
33 output unit
38 interface (obtaining unit)
39 control unit

The invention claimed is:

1. A sensor management unit, comprising a processor configured to perform operations comprising:
operation as an obtaining unit configured to obtain sensing data from a sensing device to generate sensing data of a plurality of sensing items;
operation as a detection unit configured to detect an overloaded state of the sensing device;
operation as a retrieval unit configured to retrieve, based on a detection result obtained by the detection unit, at least one sensing item from the plurality of sensing items within a range in which the sensing device avoids an overloaded state; and operation as an output unit configured to output the retrieved at least one sensing item to an external device, wherein the processor is configured such that the operation as the output unit comprises dynamically updating metadata by outputting the metadata about the sensing device including the retrieved at least one sensing item.

2. The sensor management unit according to claim 1, wherein the processor is configured such that the operation as the detection unit comprises detecting an overloaded state of the sensing device based on power consumption of the sensing device.

3. The sensor management unit according to claim 1, wherein the processor is configured such that the operation as the detection unit comprises detecting an overloaded state of the sensing device based on a processing load of a central processing unit included in the sensing device.

4. The sensor management unit according to claim 1, wherein the processor is configured such that the operation as the detection unit comprises detecting an overloaded state of the sensing device based on an amount of heat generated by the sensing device.

5. The sensor management unit according to claim 1, wherein the processor is configured such that the operation as the detection unit comprises detecting an overloaded state of the sensing device based on a capacity of communication between the sensor management unit and the sensing device.

6. A sensor device, comprising:
a sensor management unit according to claim 1; and
a sensing device configured to generate sensing data of a plurality of sensing items.

7. A sensor management method implementable by a computer, the method comprising:

obtaining sensing data from a sensing device to generate sensing data of a plurality of sensing items;

detecting an overloaded state of the sensing device;

retrieving, based on whether the sensing device is overloaded, at least one sensing item from the plurality of sensing items within a range in which the sensing device avoids an overloaded state; and outputting the retrieved at least one sensing item to an external device, wherein the outputting the retrieved at least one sensing item comprises dynamically updating metadata by outputting the metadata about the sensing device including the retrieved at least one sensing item.

8. A non-transitory computer-readable storage medium storing a sensor management program causing a computer to implement:

obtaining sensing data from a sensing device to generate sensing data of a plurality of sensing items;

detecting an overloaded state of the sensing device;

retrieving, based on whether the sensing device is overloaded, at least one sensing item from the plurality of sensing items within a range in which the sensing device avoids an overloaded state; and outputting the retrieved at least one sensing item to an external device, wherein the outputting the retrieved at least one sensing item comprises dynamically updating metadata by outputting the metadata about the sensing device including the retrieved at least one sensing item.

* * * * *